US012788661B2

(12) United States Patent
Dixon

(10) Patent No.: US 12,788,661 B2
(45) Date of Patent: Nov. 10, 2026

(54) REHABILITATION APPARATUS

(71) Applicant: Tomika McCall-Dixon, Longview, TX (US)

(72) Inventor: Lyntell Dixon, Longview, TX (US)

( * ) Notice: Subject to any disclaimer, the term of this patent is extended or adjusted under 35 U.S.C. 154(b) by 357 days.

(21) Appl. No.: 18/659,866

(22) Filed: May 9, 2024

(65) Prior Publication Data

US 2025/0345226 A1 Nov. 13, 2025

(51) Int. Cl.
*A61H 1/02* (2006.01)
*A61H 1/00* (2006.01)

(52) U.S. Cl.
CPC ........... *A61H 1/001* (2013.01); *A61H 1/0255* (2013.01); *A61H 1/0277* (2013.01); *A61H 1/0281* (2013.01); *A61H 1/0288* (2013.01); *A61H 2201/0149* (2013.01); *A61H 2201/1638* (2013.01); *A61H 2201/1642* (2013.01); *A61H 2203/0431* (2013.01)

(58) Field of Classification Search
CPC ............ A61H 1/001; A61H 2201/0149; A61H 2203/0431; A61H 1/0281; A61H 1/0274
See application file for complete search history.

(56) References Cited

U.S. PATENT DOCUMENTS 3,641,995 A * 2/1972 Brandt ................ A61H 1/0292 601/26
4,966,413 A * 10/1990 Palarski .................. A47C 7/38 297/284.6
5,820,519 A 10/1998 Slenker
7,066,896 B1 * 6/2006 Kiselik ................ A61H 1/0237 601/5
7,452,308 B2 * 11/2008 Robideau ................. A61H 1/02 482/52
8,177,688 B2 5/2012 Burnfield
8,454,541 B2 6/2013 Olsen
8,523,792 B2 9/2013 Weisz
8,845,560 B1 * 9/2014 Hernandez ........... A61H 1/0281 601/24
2003/0073552 A1 * 4/2003 Knight ................... A47C 9/002 482/148
2003/0130600 A1 * 7/2003 Branch ................ A61H 1/0281 601/5
2005/0209055 A1 * 9/2005 Anders ................ A61H 1/0218 482/92
2006/0277074 A1 * 12/2006 Einav ..................... G16H 20/30 705/3

(Continued)

FOREIGN PATENT DOCUMENTS

WO WO0156662 8/2001

*Primary Examiner* — Timothy A Stanis
*Assistant Examiner* — Christopher E Miller

(57) ABSTRACT

A rehabilitation apparatus for stretching and strengthening a body of a user includes a chair including a seat and a back rest support a body of a user in a seated position. A pair of leg members extend forwardly from the seat to receive the legs of the user. Each leg member is upwardly and downwardly pivotable relative to the chair wherein each leg member of the pair of leg members is designed to facilitate the user in exercising a respective leg. A pair of arm members extend outwardly from the back rest to receive the arms of the user. Each arm member is forwardly and backwardly pivotable relative to the chair wherein each arm member is designed to facilitate the user in exercising a respective arm.

17 Claims, 6 Drawing Sheets

(56) References Cited

U.S. PATENT DOCUMENTS

| | | | | |
|---|---|---|---|---|
| 2008/0132383 | A1* | 6/2008 | Einav | A61B 5/4824<br>482/8 |
| 2010/0313897 | A1 | 12/2010 | Schaeffer | |
| 2012/0298113 | A1* | 11/2012 | Hruska | A61H 1/001<br>128/845 |
| 2016/0051434 | A1* | 2/2016 | Erkiliç | A61H 1/0237<br>601/26 |
| 2022/0313510 | A1* | 10/2022 | Shenhod Malihi | A61H 1/0262 |
| 2024/0216741 | A1* | 7/2024 | Branch | A61H 1/0281 |
| 2026/0021002 | A1* | 1/2026 | Park | A61H 1/0281 |
| 2026/0076858 | A1* | 3/2026 | Kreamer-Tonin | A61H 3/00 |

* cited by examiner

REHABILITATION APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to physical therapy equipment and more particularly pertains to a new physical therapy equipment for stretching and strengthening a body of a user.

(2) Description of Related Art Including Information Disclosed Under 37 CFR 1.97 and 1.98

The prior art relates to physical therapy equipment. For example, the prior art discloses elastic bands and inflated balls for use during physical therapy exercises to stretch and strengthen portions of the body. However, individuals with serious medical concerns, such as stroke survivors, people with Multiple Sclerosis, or individuals with limited control of their arms or legs, often need more intensive therapeutic treatments. For example, regular stretching and exercising is important to enhance the range of motion for affected muscles and to keep joints strong and flexible. The prior art has disclosed some devices, such as prosthetics and modified exercise equipment, to meet some of those needs. However, most people still require the assistance of a physical therapist or other medical professional for stretching and strengthening the affected muscles. The prior art lacks disclosure of a single apparatus that can stretch isolated muscle groups in the arms, legs, hands, and feet of the user while also resisting movement of those isolated muscle groups to exercise and strengthen the muscles. Ideally, such a machine would be easy for a user to use themselves, without having a physical therapist on-site to set up or manipulate the machine.

BRIEF SUMMARY OF THE INVENTION

An embodiment of the disclosure meets the needs presented above by generally comprising a chair including a seat and a back rest that is coupled to and extends upwardly from the seat. The chair is configured to support a body of a user in a seated position. A pair of leg members is coupled to the chair. The pair of leg members extend forwardly from the seat wherein each leg member of the pair of leg members is configured to receive a respective leg of the user when the user is sitting in the chair. Each leg member of the pair of leg members is pivotably coupled to the chair. Each leg member of the pair of leg members is upwardly and downwardly pivotable relative to the chair wherein each leg member of the pair of leg members is configured to facilitate the user in exercising the respective leg. A pair of arm members is coupled to the chair.

Each arm member of the pair of arm members extends outwardly from the back rest wherein each arm member of the pair of arm members is configured to receive a respective arm of the user when the user is sitting in the chair. Each arm member of the pair of arm members is pivotably coupled to the chair. Each arm member of the pair of arm members is forwardly and backwardly pivotable relative to the chair wherein each arm member of the pair of arm members is configured to facilitate the user in exercising the respective arm.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
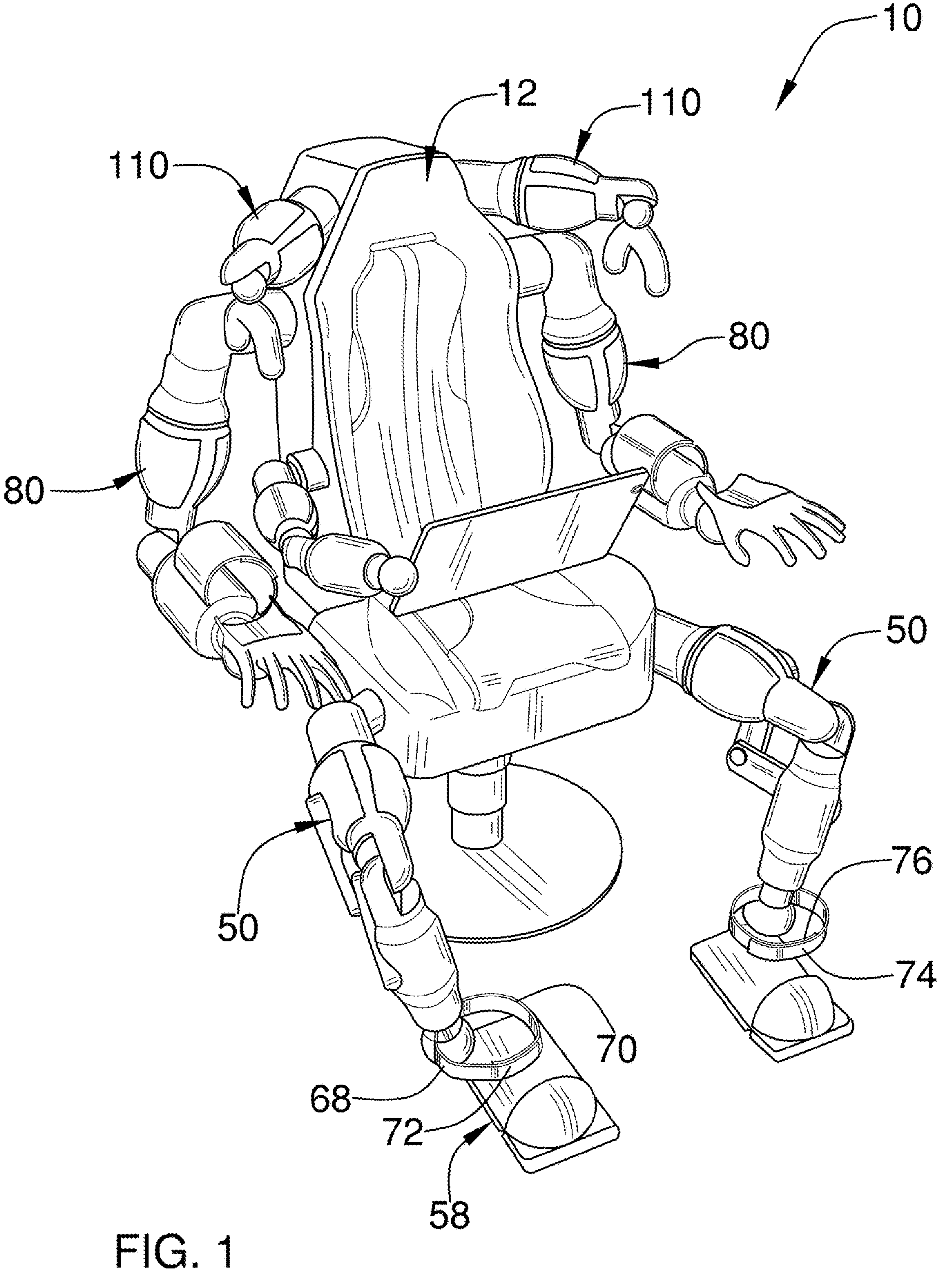
FIG. 1 is a front isometric view of a rehabilitation apparatus according to an embodiment of the disclosure.
Figure 2:
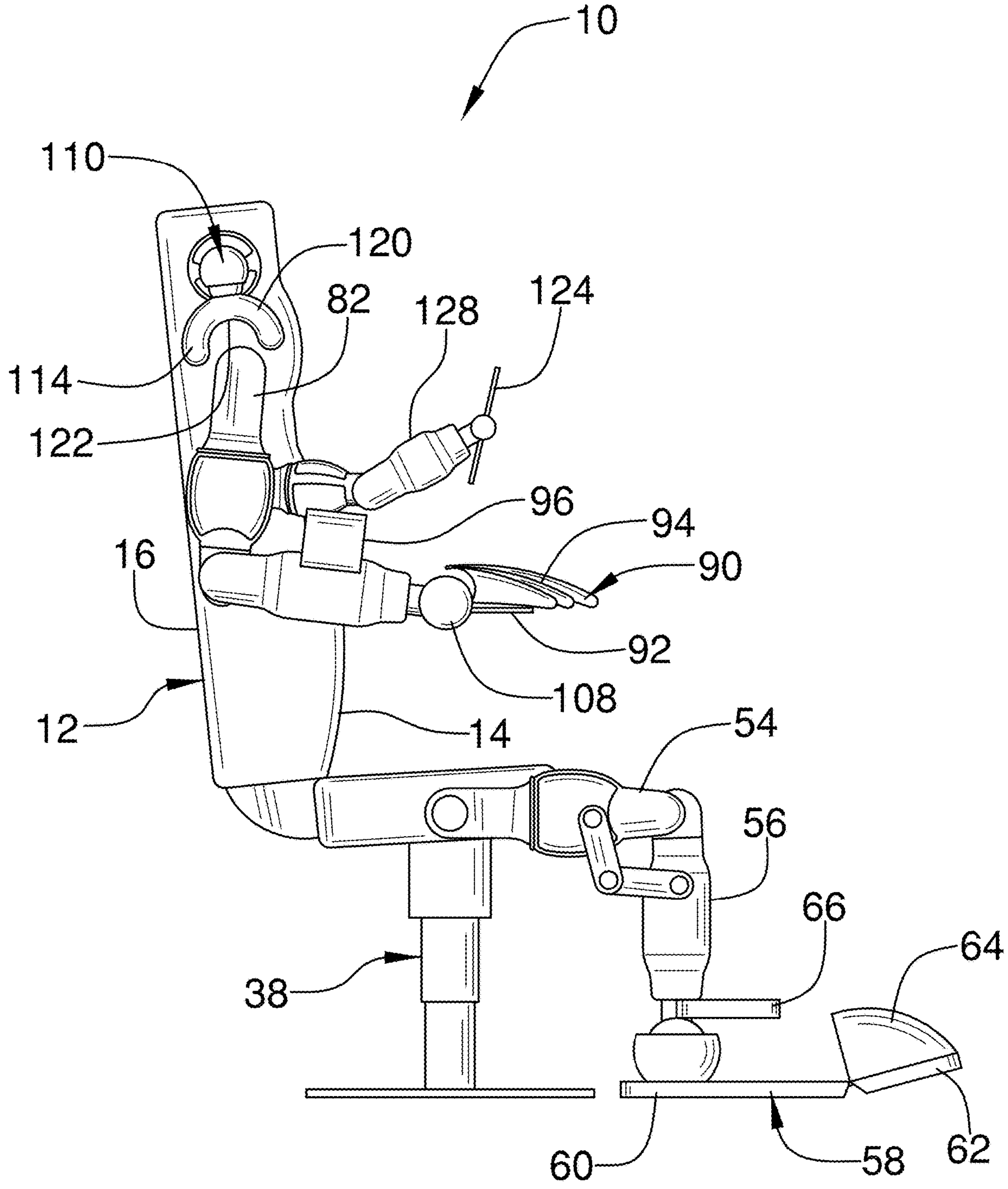
FIG. 2 is a side view of an embodiment of the disclosure.
Figure 3:
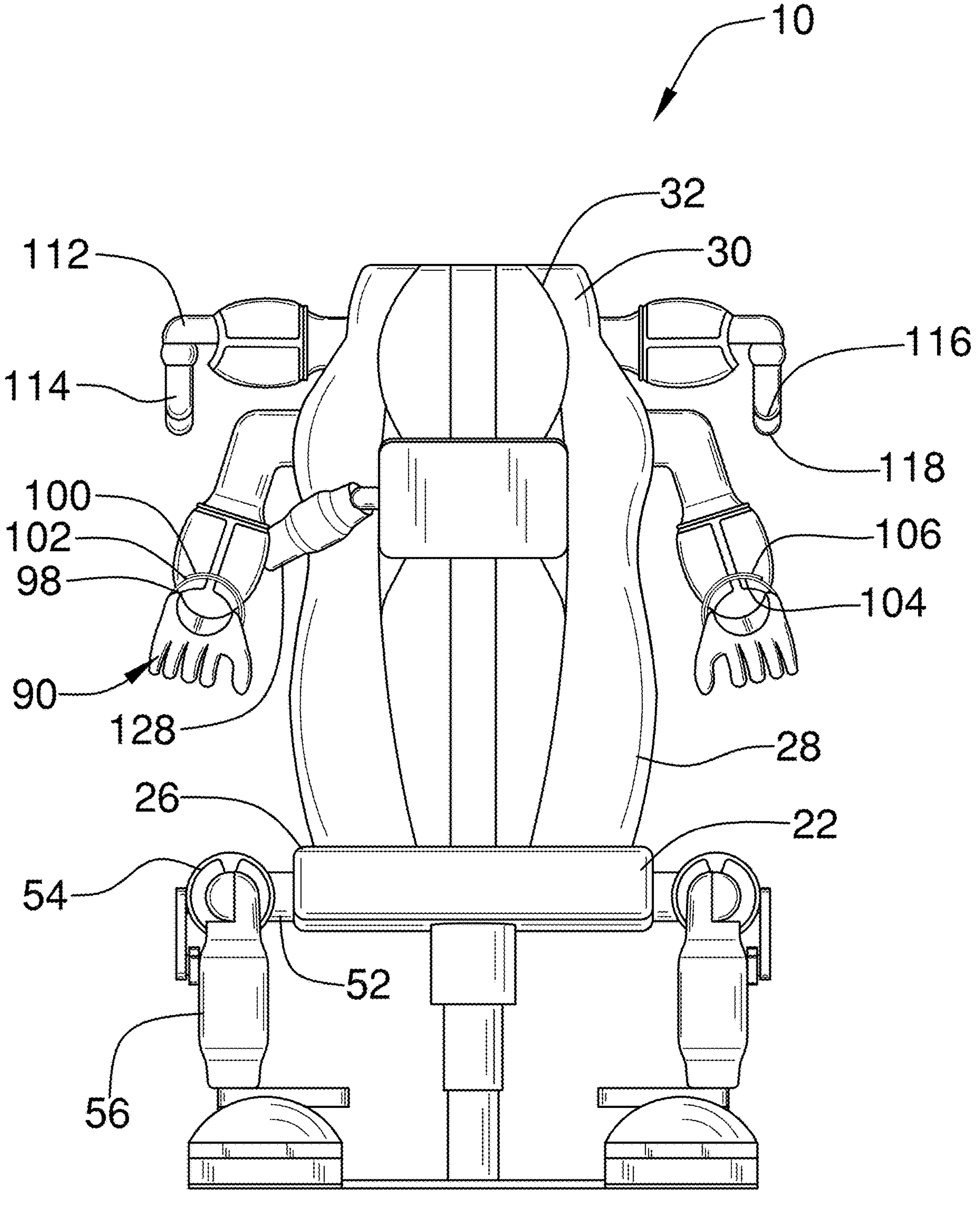
FIG. 3 is a front view of an embodiment of the disclosure.
Figure 4:
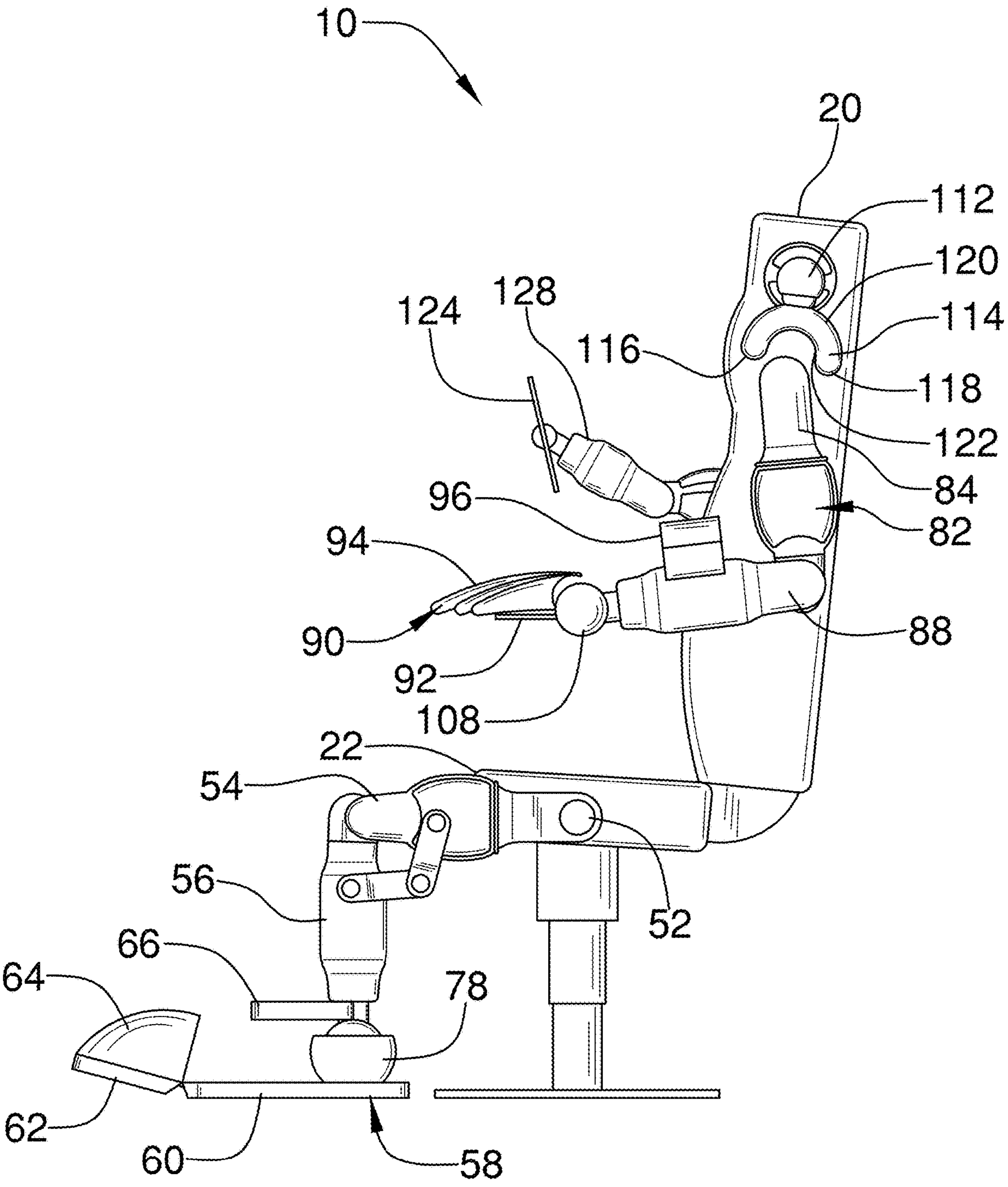
FIG. 4 is a side view of an embodiment of the disclosure.
Figure 5:
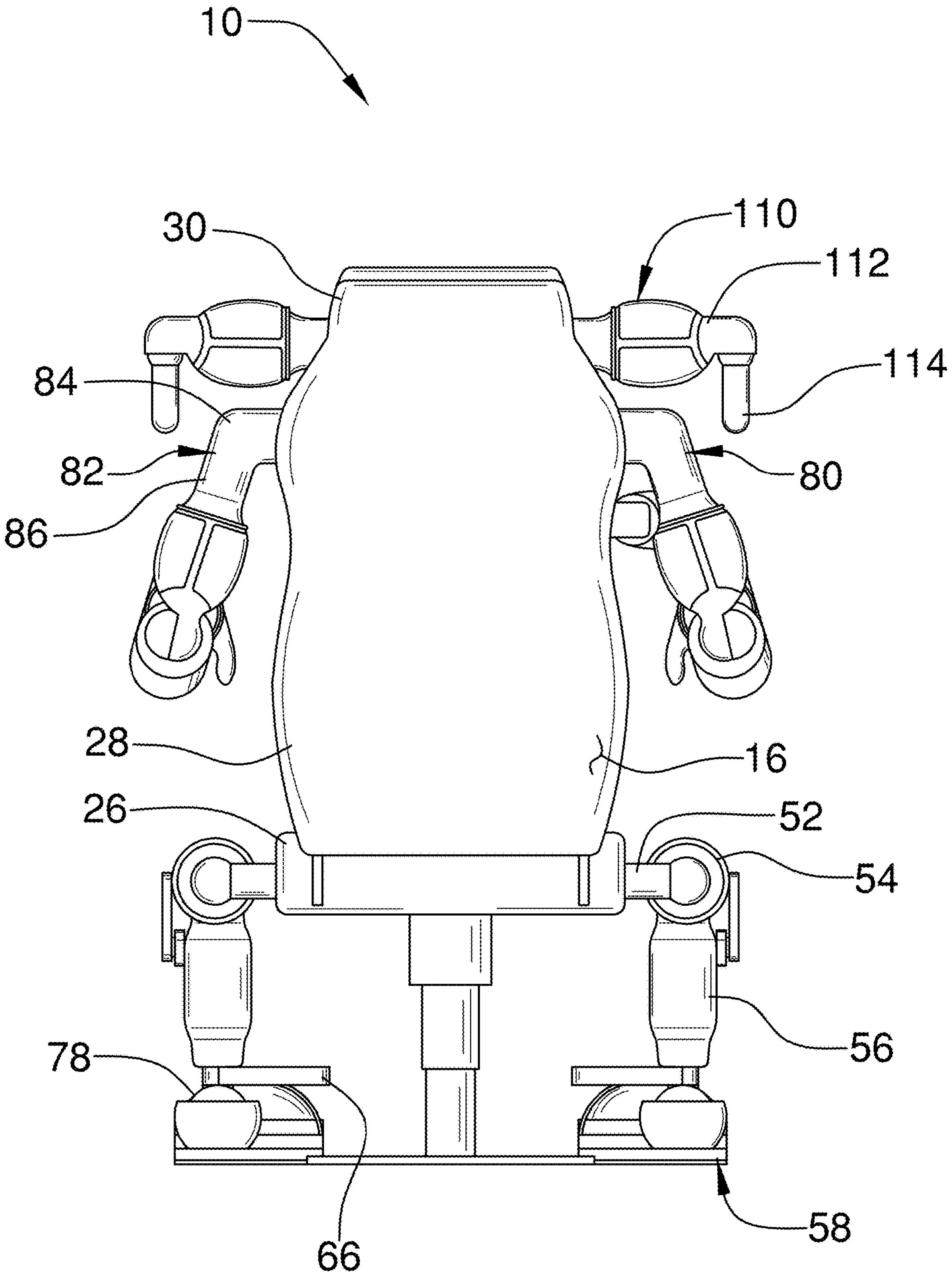
FIG. 5 is a rear view of an embodiment of the disclosure.
Figure 6:
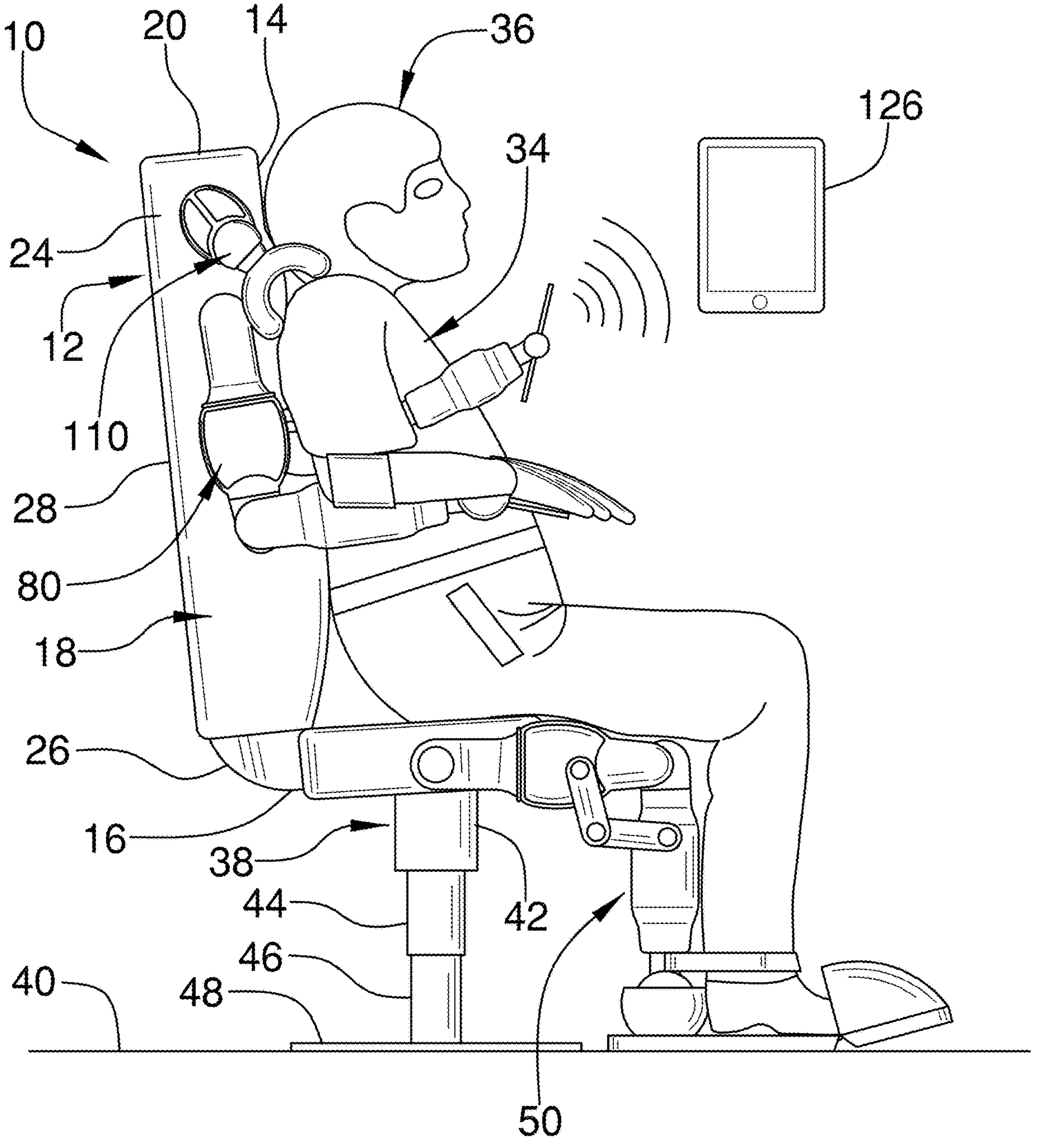
FIG. 6 is an in-use view of an embodiment of the disclosure.

With reference now to the drawings, and in particular to FIGS. 1 through 6 thereof, a new physical therapy equipment embodying the principles and concepts of an embodiment of the disclosure and generally designated by the reference numeral 10 will be described.

As best illustrated in FIGS. 1 through 6, the rehabilitation apparatus 10 generally comprises a chair 12 which generally has an upper surface 14, a lower surface 16, and a peripheral side 18 that is coupled to and extends between the upper surface 14 and the lower surface 16. The peripheral side 18 may include a top end 20, a bottom end 22, and a pair of lateral ends 24 extending between the top end 20 and the bottom end 22.

The chair 12 further includes a seat 26. The bottom end 22 of the peripheral side 18 is positioned on the seat 26. A back rest 28 is coupled to and extends upwardly from the seat 26 wherein the chair 12 is configured to support a body 34 of a user 36 in a seated position.

A head rest 30 may be coupled to and extend upwardly from the back rest 28 distally to the seat 26 portion. The top end 20 of the peripheral side 18 is generally positioned on the head rest 30 distally to the back rest 28. A pad 32 may be positioned on the upper surface 14 of the chair 12. The pad 32 may be positioned on each of the seat 26, the back rest 28, and the head rest 28. The pad 32 generally comprises a resiliently compressible material wherein the pad 32 is configured to increase comfort of the user 36 when the user 36 is sitting in the chair 12.

A base assembly 38 may be coupled to the lower surface 16 of the seat 26 of the chair 12. The base assembly 38 is configured to be positioned on a ground surface 40 to support the chair 12 above the ground surface 40.

For example, the base assembly 38 may include a first shaft 42 that extends downwardly from the lower surface 16 of the seat 26. The first shaft 42 may be centrally positioned on the lower surface 16 of the seat 26. A second shaft 44 may be telescopically coupled to the first shaft 42. For example, the second shaft 44 may be nested within the first shaft 42. The second shaft 44 extends downwardly from the first shaft 42. A third shaft 46 may be telescopically coupled to the second shaft 44. For example, the third shaft 46 may be nested within the second shaft 44. The third shaft 46 extends downwardly from the second shaft 44. A base plate 48 may be coupled to the third shaft 46 distally to the second shaft 44. The base plate 48 may be planar wherein the base plate 48 is configured to rest on the ground surface 40. The base plate 48 may be circular.

A pair of leg members 50 is coupled to the chair 12. The pair of leg members 50 is generally positioned on the seat 26 proximate to the bottom end 22. The pair of leg members 50 extend forwardly from the seat 26 past the bottom end 22. Each leg member of the pair of leg members 50 is positioned on a respective lateral end of the pair of lateral ends 24 of the peripheral side 18 of the chair 12. Each leg member of the pair of leg members 50 is configured to receive a respective leg of the user 36 when the user 36 is sitting in the chair 12.

Each leg member of the pair of leg members 50 may be pivotably coupled to the chair 12. Each leg member of the pair of leg members 50 may be upwardly and downwardly pivotable relative to the chair 12 wherein each leg member of the pair of leg members 50 is configured to facilitate the user 36 in exercising the respective leg. Each leg member of the pair of leg members 50 may be inwardly and outwardly pivotable relative to the chair 12 wherein each leg member of the pair of leg members 50 is configured to facilitate the user 36 in exercising the respective leg. For example, each leg member of the pair of leg members 50 may pivot upward as the user 36 pulls the respective leg upward. Each leg member of the pair of leg members 50 may be programmable to stretch or move the respective leg of the user 36 through certain exercises or movements. A weight of each leg member of the pair of leg members 50 may be designed to strengthen the respective leg as the user 36 pulls the respective leg upward.

Each leg member of the pair of leg members 50 may be configured to resist movement of the respective leg of the user 36 wherein each leg member of the pair of leg members 50 is configured to facilitate the user 36 in strengthening the respective leg. For example, the weight of each leg member of the pair of leg members 50 may resist movement of the respective leg. In another example, each leg member of the pair of leg members 50 may mechanically, oppose movement of the respective leg to facilitate and enhance exercise of the respective leg. For example, hydraulics may be used to mechanically oppose movement of the respective leg.

Each leg member of the pair of leg members 50 generally includes a coupling rod 52 that extends outwardly from the seat 26. The coupling rod 52 may be pivotably coupled to the seat 26. A thigh rod 54 may be coupled to and extend forwardly from the coupling rod 52 wherein the thigh rod 54 is configured to align with a thigh of the respective leg of the user 36 when the user 36 is sitting in the chair 12. The thigh rod 54 may be perpendicular to the coupling rod 52. The thigh rod 54 may be pivotably coupled to the coupling rod 52.

A calf rod 56 may be coupled to the thigh rod 54 distally to the coupling rod 52. The calf rod 56 is configured to align with a calf of the respective leg of the user 36 when the user 36 is sitting in the chair 12. The calf rod 56 may be pivotably coupled to the thigh rod 54. For example, the calf rod 56 may be pivotable to a stretched leg position wherein the calf rod 56 is parallel to the thigh rod 54 when the calf rod 56 is in the stretched leg position. The calf rod 56 may also be pivotable to a relaxed leg position wherein the calf rod 56 is perpendicular to the thigh rod 54 when the calf rod 56 is in the relaxed leg position.

A foot plate 58 may be coupled to the calf rod 56. The foot plate 58 generally extends outwardly from the calf rod 56 away from the chair 12. The foot plate 58 is configured to support a foot of the respective leg of the user 36 when the user 36 is sitting in the chair 12.

For example, the foot plate 58 may include a heel panel 60 that extends outwardly from the calf rod 56. The heel panel 60 may be perpendicular to the calf rod 56 wherein the heel panel 60 is configured to support the foot of the user 36 when the foot is resting flat against the foot plate 58. A toe panel 62 may be coupled to the heel panel 60. The toe panel 62 generally extends outwardly from the heel panel 60. The toe panel 62 may be angled extending upwardly from the heel panel 60.

A toe cover 64 may be coupled to the toe panel 62. The toe cover 64 may extend over the toe panel 62. The toe cover 64 is configured to extend over the foot of the respective leg of the user 36 to secure the foot of the respective leg on the foot plate 58. The toe cover 64 may be curved wherein the toe cover 64 has a quarter sphere shape such that the toe panel 62 and the toe cover 64 encompass the toes and front portion of the foot of the user.

An ankle strap 66 may be coupled to the calf rod 56. The ankle strap 66 is generally spaced from the thigh rod 54. For example, the ankle strap 66 may be positioned proximate to the foot plate 58. The ankle strap 66 is configured to secure an ankle of the respective leg of the user 36 to the calf rod 56 when the user 36 is sitting in the chair 12.

Embodiments of the ankle strap 66 may include an ankle strap first portion 68 that extends outwardly from the calf rod 56. An ankle strap second portion 70 may extend outwardly from the calf rod 56 distally to the ankle strap first portion 68. The ankle strap second portion 70 is generally aligned with the ankle strap first portion 68.

The ankle strap first portion 68 and the ankle strap second portion 70 may be tied together to secure the ankle to the calf rod. Alternatively, an ankle strap fastener 72 may releasably couple the ankle strap first portion 68 to the ankle strap second portion 70. For example, the ankle strap fastener 72 may include an ankle strap first portion fastening member 74 that is coupled to the ankle strap first portion 68. An ankle strap second portion fastening member 76 is releasably engageable with the ankle strap first portion fastening member 74. The ankle strap second portion fastening member 76 is coupled to the ankle strap second portion 70. For example, each of the ankle strap first portion fastening member 74 and the ankle strap second portion fastening member 76 of the ankle strap fastener 72 may comprise hook and loop materials, buckles, buttons, snaps, magnets, or other cooperating and fastening materials.

An ankle ball joint 78 may couple the foot plate 58 to the calf rod 56. The ankle strap 66 may be positioned adjacent to the ankle ball joint 78. The ankle ball joint 78 may pivotably couple the foot plate 58 to the calf rod 56 wherein the foot plate 58 is pivotable toward opposing lateral sides of the calf rod 56 and wherein the foot plate 58 is pivotable upwardly and downwardly relative to the calf rod 56.

A pair of arm members 80 is coupled to the chair 12. The pair of arm members 80 may be positioned on the back rest 28, for example proximate to the head rest 30. Each arm member of the pair of arm members 80 may extend outwardly from a respective lateral end of the pair of lateral ends 24 of the peripheral side 18 of the chair 12. Each arm member of the pair of arm members 80 is generally configured to receive a respective arm of the user 36 when the user 36 is sitting in the chair 12.

Each arm member of the pair of arm members 80 may be pivotably coupled to the chair 12. Each arm member of the pair of arm members 80 may be forwardly and backwardly pivotable relative to the chair 12 wherein each arm member of the pair of arm members 80 is configured to facilitate the user 36 in exercising the respective arm. Each arm member of the pair of arm members 80 may be upwardly and downwardly pivotable relative to the chair 12 wherein each arm member of the pair of arm members 80 is configured to facilitate the user 36 in exercising the respective arm. For example, each arm member of the pair of arm members 80 may pivot forwardly as the user 36 extends the respective arm outward. A weight of each arm member of the pair of arm members 80 may be designed to strengthen the respective arm as the user 36 extends the respective arm outward. In another example, each arm member of the pair of arm members 80 may be programmable to stretch or move the respective arm through certain exercises or movements.

Each arm member of the pair of arm members 80 may be configured to resist movement of the respective arm of the user 36 wherein each arm member of the pair of arm members 80 is configured to facilitate the user 36 in strengthening the respective arm. For example, the weight of each arm member of the pair of arm members 80 may resist movement of the respective arm. In another example, each arm member of the pair of arm members 80 may mechanically oppose movement of the respective arm to facilitate and enhance exercise of the respective arm. For example, hydraulics may be used to mechanically oppose movement of the respective arm.

Each arm member of the pair of arm members 80 may include an upper arm rod 82 that is configured to align with an upper arm of the respective arm of the user 36 when the user 36 is sitting in the chair 12. The upper arm rod 82 may have a horizontal portion 84 and a vertical portion 86. The horizontal portion 84 may be perpendicular to the vertical portion 86 wherein the upper arm rod 82 has an L-shape. The horizontal portion 84 may extend outwardly from the back rest 28. The vertical portion 86 extends downwardly from the horizontal portion 84. The vertical portion 86 may be pivotably coupled to the horizontal portion 84.

A forearm rod 88 may be coupled to the upper arm rod 82. The forearm rod 88 is configured to align with a forearm of the respective arm of the user 36. The forearm rod 88 may extend forwardly from the vertical portion 86 of the upper arm rod 82 distally to the horizontal portion 84.

The forearm rod 88 may be pivotably coupled to the upper arm rod 82. For example, the forearm rod 88 may be pivotable to a stretched arm position wherein the forearm rod 88 is parallel to the upper arm rod 82 when the forearm rod 88 is in the stretched arm position. The forearm rod 88 may be pivotable to a relaxed arm position wherein the forearm rod 88 is perpendicular to the upper arm rod 82 when the forearm rod 88 is in the relaxed arm position.

A glove 90 may be coupled to the forearm rod 88 distally to the upper arm rod 82. The glove 90 is generally configured to receive a hand of the respective arm of the user 36 when the user 36 is sitting in the chair 12. For example, the glove 90 may include a palm plate 92 that extends forwardly from the forearm rod 88. The palm plate 92 is configured to support a palm of the hand of the respective arm of the user 36 when the user 36 is sitting in the chair 12. A plurality of finger sleeves 94 may be coupled to and extend forwardly from the palm plate 92. Each finger sleeve of the plurality of finger sleeves 94 is configured to receive a respective finger of the hand of the respective arm of the user 36 when the user 36 is sitting in the chair 12. Each finger sleeve of the plurality of finger sleeves 94 may be flexible wherein each finger sleeve of the plurality of finger sleeves 94 is configured to bend when the user 36 bends the respective finger of the hand.

A forearm strap 96 may be coupled to the forearm rod 88. The forearm strap 96 is generally spaced from the upper arm rod 82. For example, the forearm strap 96 may be positioned proximate to the glove 90. The forearm strap 96 is configured to secure the forearm of the respective arm of the user 36 to the forearm rod 88 when the user 36 is sitting in the chair 12.

The forearm strap 96 may include a forearm strap first portion 98 that extends outwardly from the forearm rod 88. A forearm strap second portion 100 may extend outwardly from the forearm rod 88 distally to the forearm strap first portion 98. The forearm strap second portion 100 is generally aligned with the forearm strap first portion 98.

The forearm strap first portion 98 and the forearm strap second portion 100 may be tied together to secure the forearm of the user 36 to the forearm rod. Alternatively, a forearm strap fastener 102 may releasably couple the forearm strap first portion 98 to the forearm strap second portion 100. The forearm strap fastener 102 may include a forearm strap first portion fastening member 104 that is coupled to the forearm strap first portion 98. A forearm strap second portion fastening member 106 may be releasably engageable with the forearm strap first portion fastening member 104. The forearm strap second portion fastening member 106 is coupled to the forearm strap second portion 100. For example, each of the forearm strap first portion fastening member 104 and the forearm strap second portion fastening member 106 of the forearm strap fastener 102 may comprise hook and loop materials, buckles, buttons, snaps, magnets, or other cooperating and fastening materials.

A wrist ball joint 108 may couple the glove 90 to the forearm rod 88. The forearm strap 96 may be positioned proximate to the wrist ball joint 108. The wrist ball joint 108 may pivotably couple the glove 90 to the forearm rod 88 wherein the glove 90 is pivotable toward opposing lateral sides of the forearm rod 88 and wherein the glove 90 is pivotable upwardly and downwardly relative to the forearm rod 88.

A pair of shoulder members 110 may be coupled to the chair 12. The pair of shoulder members 110 may be positioned above the pair of arm members 80. For example, the pair of shoulder members 110 may be positioned on the head rest 30 proximate to the top end 20 of the chair 12. Each shoulder member of the pair of shoulder members 110 may extend outwardly from a respective lateral end of the pair of lateral ends 24 of the peripheral side 18 of the chair 12. Each shoulder member of the pair of shoulder members 110 is configured to contact a respective shoulder of the user 36 when the user 36 is sitting in the chair 12. Each shoulder member of the pair of shoulder members 110 may be configured to resist movement of the respective shoulder of the user 36 wherein each shoulder member is configured to facilitate the user 36 in strengthening the respective shoulder.

Each shoulder member of the pair of shoulder members 110 may include a shoulder rod 112 that extends outwardly from the respective lateral end of the pair of lateral ends 24 of the peripheral side 18 of the chair 12. The shoulder rod 112 may be angled extending forwardly from the head rest 30 and downwardly toward the seat 26. The shoulder rod 112 may be pivotably coupled to the chair 12.

A shoulder grip 114 may be coupled to the shoulder rod 112. The shoulder grip 114 may extend downwardly from the shoulder rod 112 wherein the shoulder grip 114 is configured to contact the respective shoulder of the user 36 when the user 36 is sitting in the chair 12. The shoulder grip 114 may be pivotably coupled to the shoulder rod 112 wherein the shoulder grip 114 is configured to pivot forwardly, backwardly, upwardly, and downwardly with respect to the shoulder rod 112.

For example, the shoulder grip 114 may include a shoulder grip first end 116 and a shoulder grip second end 118. A shoulder grip upper edge 120 is generally positioned adjacent to the shoulder rod 112. The shoulder grip upper edge 120 may be convexly arcuate between the shoulder grip first end 116 and the shoulder grip second end 118. A shoulder grip lower edge 122 may be concavely arcuate between the shoulder grip first end 116 and the shoulder grip second end 118.

An electronic device 124 may be coupled to the chair 12. The electronic device 124 may be configured to wirelessly communicate with an external computing device 126. The electronic device 124 generally includes a display screen that is facing the chair 12. The electronic device 124 may be positioned in front of the back rest 28, or the head rest 30, wherein the display screen is configured to be visible to the user 36 when the user 36 is sitting in the chair 12. For example, the electronic device 124 may be a tablet.

The external computing device 126 may belong to a doctor, physical therapist, or other medical professional of the user 36 wherein the electronic device 124 is configured to facilitate the user 36 in communicating with the doctor about the exercises being performed with the rehabilitation apparatus 10. In another example, the external computing device 126 may belong to a friend or family member of the user 36 wherein the electronic device 124 is configured to facilitate the user 36 in communicating with the friend or family member. The friend or family member may provide emotional support and motivation to the user 36 as the user progresses through various exercises in the rehabilitation apparatus 10. The electronic device 124 may facilitate the user 36 in making video calls or phone calls so that the medical professional, the friend, or the family member can support the user 36 as the user 36 is exercising in the chair 12. The electronic device 124 may also having a software that enables the electronic device 124 to play video clips, either for entertainment or to guide the user 36 through exercises with the rehabilitation apparatus 10.

The electronic device 124 may have a software that enables the electronic device 124 for programming one or more of the pair of leg members 50, the pair of arm members 80, and the pair of shoulder members 110. The software may facilitate the user 36 in selectively actuating movement of one or more of the pair of leg members 50, the pair of arm members 80, and the pair of shoulder members 110 to facilitate the user 36 in exercising the body 34. For example, the software may enable the user 36, or a medical professional, to program the pair of leg members 50 to electronically progress through a series of movements or exercises designed to strengthen the legs of the user 36. The software may enable the user 36, or the medical professional, to adjust the difficulty of the exercises, for example by increasing or decreasing an amount of resistance that each leg member of the pair of leg members 50 exerts on the respective leg of the user 36 as the user 36 moves through the series of exercises.

An electronic device support arm 128 may couple the electronic device 124 to the chair 12. The electronic device support arm 128 may be positioned on a lateral end of the pair of lateral ends 24 of the peripheral side 18 of the chair 12. The electronic device support arm 128 may extend forwardly from the back rest 28 wherein the display screen is configured to be positioned in front of and facing the user 36 when the user 36 is sitting in the chair 12. The electronic device support arm 128 may be articulated wherein a position of the electronic device 124 relative to the chair 12 is adjustable.

In use, the rehabilitation apparatus 10 can facilitate stretching and exercising of muscles throughout the shoulders, arms, wrists, fingers, legs, and feet of the user 36. The rehabilitation apparatus 10 may be used for both sides of the body 34, a single side of the body 34, or for the upper and lower extremities of the body 34, based on the needs of the user 36. The movements may be adjusted as the user 36 becomes stronger and more flexible. Articulation and movement of the pair of leg members 50, the pair of arm members 80, and the pair of shoulder members 110 may be actuated by hydraulics or another mechanical means. The software on the electronic device 124 may facilitate the user 36 in programming various exercise movements or progressions, or in isolating certain muscle groups or areas of the body 34 for the rehabilitation apparatus to stretch and strengthen.

The pair of leg members 50 may guide and resist the user 36 through a full range of motion of the legs and feet of the user 36. The pair of leg members 50 may guide each respective leg upward and downward relative to the chair 12, or inward and outward relative to each other. For example, each leg member of the pair of leg members 50 may guide the respective leg upward to the stretched leg position and resist the user 36 as the user 36 moves the respective leg back down to the relaxed leg position. In another example, each leg member may resist the user 36 as the user 36 moves the respective leg upward to the stretched leg position and each leg member may guide the respective leg back to the relaxed leg position.

The feet of the user 36 may be placed flat on the foot plate 58 of each leg member of the pair of leg members 50. The ankle ball joint 78 may rotate each foot of the user 36 in circular patterns to stretch and strengthen the foot and ankle muscles. The ankle ball joint 78 may also facilitate the user 36 in moving through a full range of motion for the ankles, such as upward and downward movement or side to side movement. The ankle ball joint 78 may resist movement of the user 36 and guide movement of the user 36, similarly to the resistance and guidance offered by the pair of leg members 50. The pair of leg members 50 may also facilitate the user 36 in aligning their feet with their legs.

Each arm member of the pair of arm members 80 may guide and resist the user 36 through a full range of motion of the arms, wrists, and hands of the user 36. Each arm member of the pair of arm members 80 may pull the respective arm forward and exert resistance as the user 36 draws the respective arm back toward the body 34. Each arm member of the pair of arm members 80 may also resist the user 36 as the user 36 moves the respective arm forward and away from the body 34, further strengthening the respective arm. Upward and downward movements of the arms, and isolated movements of the forearm and the upper arm, are also contemplated. For example, each arm member of the pair of arm members 80 may guide the respective arm outward to the stretched arm position and resist the user 36 as the user 36 moves the respective arm back to the relaxed arm position. In another example, each arm member may resist the user 36 as the user 36 moves the respective arm outward to the stretched arm position, and each arm member may guide the respective arm back to the relaxed arm position.

The glove 90 may alternately open and close the hand of the user 36, for example by flexing and releasing each finger on the hand of the user 36. When the hand of the user 36 opens, the glove 90 may resist the user 36 as the user 36 closes the hand back up. The plurality of finger portions may also be pivotably coupled to the palm plate 92, such that the plurality of finger portions are movable in circles to stretch each respective finger on the hand. The wrist ball joint 108 may rotate the hand in circular movements or may flex the hand back and forth relative to the forearm rod 88. The pair of arm members 80 may also facilitate the user 36 in aligning their hands and wrists with their arms.

The pair of shoulder members 110 may push each respective shoulder up or down. For example, the pair of arm members 80 may move upward such that the shoulders of the user 36 also hunch upward toward the head of the user 36. The pair of shoulder members 110 may resist the upward movement of the shoulders of the user 36, to stretch the neck and shoulder muscles of the user 36. The pair of shoulder members 110 may also lift the shoulders of the user 36 and guide the shoulders back downward. The pair of shoulder members 110 may also guide the user 36 in rotating each respective shoulder forward and backward.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mobility training assembly comprising:

a chair including a seat and a back rest being coupled to and extending upwardly from the seat wherein the chair is configured to support a body of a user in a seated position;

a pair of leg members being coupled to the chair, the pair of leg members extending forwardly from the seat wherein each leg member of the pair of leg members is configured to receive a respective leg of the user when the user is sitting in the chair, each leg member of the pair of leg members being pivotably coupled to the chair, each leg member of the pair of leg members being upwardly and downwardly pivotable relative to the chair wherein each leg member of the pair of leg members is configured to facilitate the user in exercising the respective leg; and a pair of arm members being coupled to the chair, each arm member of the pair of arm members extending outwardly from the back rest wherein each arm member of the pair of arm members is configured to receive a respective arm of the user when the user is sitting in the chair, each arm member of the pair of arm members being pivotably coupled to the chair, each arm member of the pair of arm members being forwardly and backwardly pivotable relative to the chair wherein each arm member of the pair of arm members is configured to facilitate the user in exercising the respective arm;

a pair of shoulder members being positioned above the pair of arm members, each shoulder member of the pair of shoulder members including a shoulder rod extending outwardly from the chair, the shoulder rod being angled extending forwardly from the back rest and downwardly toward the seat and having a shoulder grip extending downwardly from the shoulder rod and configured to pivot, a shoulder grip upper edge being positioned adjacent to the shoulder rod and being convexly arcuate between a shoulder grip first end and a shoulder grip second end, and a shoulder grip lower edge being concavely arcuate between the shoulder grip first end and the shoulder grip second end and configured to contact the respective shoulder of the user and configured to resist movement of the respective shoulder of the user; and an electronic device having a display screen configured to be coupled to the chair and having software configuring the electronic device for programming and actuating movement of the pair of leg members, the pair of arm members, and the pair of shoulder members to facilitate the user in exercising the body.

2. The mobility training assembly of claim 1, wherein each leg member of the pair of leg members is configured to resist movement of the respective leg of the user wherein each leg member of the pair of leg members is configured to facilitate the user in strengthening the respective leg.

3. The mobility training assembly of claim 1, wherein each leg member of the pair of leg members is inwardly and outwardly pivotable relative to the chair wherein each leg member of the pair of leg members is configured to facilitate the user in exercising the respective leg.

4. The mobility training assembly of claim 1, each leg member of the pair of leg members further comprising:

a coupling rod extending outwardly from the seat;

a thigh rod being coupled to and extending forwardly from the coupling rod wherein the thigh rod is configured to align with a thigh of the respective leg of the user when the user is sitting in the chair; and a calf rod being coupled to the thigh rod distally to the coupling rod wherein the calf rod is configured to align with a calf of the respective leg of the user when the user is sitting in the chair, the calf rod being pivotably coupled to the thigh rod.

5. The mobility training assembly of claim 4, wherein the calf rod is pivotable to a stretched leg position wherein the calf rod is parallel to the thigh rod when the calf rod is in the stretched leg position, the calf rod being pivotable to a relaxed leg position wherein the calf rod is perpendicular to the thigh rod when the calf rod is in the relaxed leg position.

6. The mobility training assembly of claim 4, each leg member of the pair of leg members further comprising a foot plate being coupled to the calf rod, the foot plate extending outwardly from the calf rod away from the chair wherein the foot plate is configured to support a foot of the respective leg of the user when the user is sitting in the chair.

7. The mobility training assembly of claim 6, each leg member of the pair of leg members further comprising an ankle ball joint coupling the foot plate to the calf rod, the ankle ball joint pivotably coupling the foot plate to the calf rod wherein the foot plate is pivotable toward opposing lateral sides of the calf rod and wherein the foot plate is pivotable upwardly and downwardly relative to the calf rod.

8. The mobility training assembly of claim 1, wherein each arm member of the pair of arm members is upwardly and downwardly pivotable relative to the chair wherein each arm member of the pair of arm members is configured to facilitate the user in exercising the respective arm.

9. The mobility training assembly of claim 1, wherein each arm member of the pair of arm members is configured to resist movement of the respective arm of the user wherein each arm member of the pair of arm members is configured to facilitate the user in strengthening the respective arm.

10. The mobility training assembly of claim 1, each arm member of the pair of arm members further comprising:

an upper arm rod being configured to align with an upper arm of the respective arm of the user when the user is sitting in the chair; and a forearm rod being coupled to the upper arm rod wherein the forearm rod is configured to align with a forearm of the respective arm of the user, the forearm rod extending forwardly from the vertical portion of the upper arm rod distally to the horizontal portion, the forearm rod being pivotably coupled to the upper arm rod, the forearm rod being pivotable to a stretched arm position wherein the forearm rod is parallel to the upper arm rod when the forearm rod is in the stretched arm position, the forearm rod being pivotable to a relaxed arm position wherein the forearm rod is perpendicular to the upper arm rod when the forearm rod is in the relaxed arm position.

11. The mobility training assembly of claim 10, the upper arm rod further comprising a horizontal portion and a vertical portion, the horizontal portion being perpendicular to the vertical portion wherein the upper arm rod has an L-shape, the horizontal portion extending outwardly from the back rest, the vertical portion extending downwardly from the horizontal portion.

12. The mobility training assembly of claim 10, each arm member of the pair of arm members further comprising a glove being coupled to the forearm rod distally to the upper arm rod wherein the glove is configured to receive a hand of the respective arm of the user when the user is sitting in the chair.

13. The mobility training assembly of claim 12, the glove further comprising:

a palm plate extending forwardly from the forearm rod wherein the palm plate is configured to support a palm of the hand of the respective arm of the user when the user is sitting in the chair; and a plurality of finger sleeves being coupled to and extending forwardly from the palm plate wherein each finger sleeve of the plurality of finger sleeves is configured to receive a respective finger of the hand of the respective arm of the user when the user is sitting in the chair, each finger sleeve of the plurality of finger sleeves being flexible wherein each finger sleeve of the plurality of finger sleeves is configured to bend when the user bends the respective finger of the hand.

14. The mobility training assembly of claim 12, each arm member of the pair of arm members further comprising a wrist ball joint coupling the glove to the forearm rod, the wrist ball joint pivotably coupling the glove to the forearm rod wherein the glove is pivotable toward opposing lateral sides of the forearm rod and wherein the glove is pivotable upwardly and downwardly relative to the forearm rod.

15. The mobility training assembly of claim 1, wherein each shoulder member is configured to facilitate the user in strengthening the respective shoulder.

16. The mobility training assembly of claim 1, further comprising an electronic device being coupled to the chair, the electronic device having a display screen facing the chair, the electronic device being positioned in front of the back rest wherein the display screen is configured to be visible to the user when the user is sitting in the chair, the electronic device having a software enabling the electronic device for programming and actuating movement of one or more of the pair of leg members and the pair of arm members, and the pair of shoulder members wherein the programming code facilitates the user in exercising the body.

17. A mobility training assembly comprising:

a chair having an upper surface, a lower surface, and a peripheral side being coupled to and extending between the upper surface and the lower surface, the peripheral side including a top end, a bottom end, and a pair of lateral ends extending between the top end and the bottom end, the chair including:

a seat, the bottom end of the peripheral side being positioned on the seat;

a back rest being coupled to and extending upwardly from the seat wherein the chair is configured to support a body of a user in a seated position;

a head rest being coupled to and extending upwardly from the back rest distally to the seat portion, the top end of the peripheral side being positioned on the head rest distally to the back rest;

a pad being positioned on the upper surface, the pad being positioned on each of the seat and the back rest, the pad comprising a resiliently compressible material wherein the pad is configured to increase comfort of the user when the user is sitting in the chair;

a base assembly being coupled to the lower surface of the seat of the chair wherein the base assembly is configured to be positioned on a ground surface to support the chair above the ground surface, the base assembly including:

a first shaft extending downwardly from the lower surface of the seat, the first shaft being centrally positioned on the lower surface of the seat;

a second shaft being telescopically coupled to the first shaft, the second shaft being nested within the first shaft, the second shaft extending downwardly from the first shaft;

a third shaft being telescopically coupled to the second shaft, the third shaft being nested within the second shaft, the third shaft extending downwardly from the second shaft;

a base plate being coupled to the third shaft distally to the second shaft, the base plate being planar wherein the base plate is configured to rest on the ground surface, the base plate being circular;

a pair of leg members being coupled to the chair, the pair of leg members being positioned on the seat proximate to the bottom end, the pair of leg members extending forwardly from the seat past the bottom end, each leg member of the pair of leg members being positioned on a respective lateral end of the pair of lateral ends of the peripheral side of the chair wherein each leg member of the pair of leg members is configured to receive a respective leg of the user when the user is sitting in the chair, each leg member of the pair of leg members being pivotably coupled to the chair, each leg member of the pair of leg members being upwardly and downwardly pivotable relative to the chair wherein each leg member of the pair of leg members is configured to facilitate the user in exercising the respective leg, each leg member of the pair of leg members being inwardly and outwardly pivotable relative to the chair wherein each leg member of the pair of leg members is configured to facilitate the user in exercising the respective leg, each leg member of the pair of leg members being configured to resist movement of the respective leg of the user wherein each leg member of the pair of leg members is configured to facilitate the user in strengthening the respective leg, each leg member of the pair of leg members including:

a coupling rod extending outwardly from the seat, the coupling rod being pivotably coupled to the seat;

a thigh rod being coupled to and extending forwardly from the coupling rod wherein the thigh rod is configured to align with a thigh of the respective leg of the user when the user is sitting in the chair, the thigh rod being perpendicular to the coupling rod, the thigh rod being pivotably coupled to the coupling rod;

a calf rod being coupled to the thigh rod distally to the coupling rod wherein the calf rod is configured to align with a calf of the respective leg of the user when the user is sitting in the chair, the calf rod being pivotably coupled to the thigh rod, the calf rod being pivotable to a stretched leg position wherein the calf rod is parallel to the thigh rod when the calf rod is in the stretched leg position, the calf rod being pivotable to a relaxed leg position wherein the calf rod is perpendicular to the thigh rod when the calf rod is in the relaxed leg position;

a foot plate being coupled to the calf rod, the foot plate extending outwardly from the calf rod away from the chair wherein the foot plate is configured to support a foot of the respective leg of the user when the user is sitting in the chair, the foot plate including:

a heel panel extending outwardly from the calf rod, the heel panel being perpendicular to the calf rod;

a toe panel being coupled to the heel panel, the toe panel extending outwardly from the heel panel, the toe panel being angled extending upwardly from the heel panel;

a toe cover being coupled to the toe panel, the toe cover extending over the toe panel wherein the toe cover is configured to extend over the foot of the respective leg of the user to secure the foot of the respective leg on the foot plate, the toe cover being curved wherein the toe cover has a quarter sphere shape;

an ankle strap being coupled to the calf rod, the ankle strap being positioned proximate to the foot plate wherein the ankle strap is configured to secure an ankle of the respective leg of the user to the calf rod when the user is sitting in the chair, the ankle strap including:

an ankle strap first portion extending outwardly from the calf rod;

an ankle strap second portion extending outwardly from the calf rod distally to the ankle strap first portion, the ankle strap second portion being aligned with the ankle strap first portion;

an ankle strap fastener releasably coupling the ankle strap first portion to the ankle strap second portion, the ankle strap fastener including:

an ankle strap first portion fastening member being coupled to the ankle strap first portion;

an ankle strap second portion fastening member being releasably engageable with the ankle strap first portion fastening member, the ankle strap second portion fastening member being coupled to the ankle strap second portion;

wherein the ankle strap fastener comprises a hook and loop material;

an ankle ball joint coupling the foot plate to the calf rod, the ankle strap being positioned adjacent to the ankle ball joint, the ankle ball joint pivotably coupling the foot plate to the calf rod wherein the foot plate is pivotable toward opposing lateral sides of the calf rod and wherein the foot plate is pivotable upwardly and downwardly relative to the calf rod;

a pair of arm members being coupled to the chair, the pair of arm members being positioned on the back rest proximate to the head rest, each arm member of the pair of arm members extending outwardly from a respective lateral end of the pair of lateral ends of the peripheral side of the chair wherein each arm member of the pair of arm members is configured to receive a respective arm of the user when the user is sitting in the chair, each arm member of the pair of arm members being pivotably coupled to the chair, each arm member of the pair of arm members being forwardly and backwardly pivotable relative to the chair wherein each arm member of the pair of arm members is configured to facilitate the user in exercising the respective arm, each arm member of the pair of arm members being upwardly and downwardly pivotable relative to the chair wherein each arm member of the pair of arm members is configured to facilitate the user in exercising the respective arm, each arm member of the pair of arm members being configured to resist movement of the respective arm of the user wherein each arm member of the pair of arm members is configured to facilitate the user in strengthening the respective arm, each arm member of the pair of arm members including:

an upper arm rod being configured to align with an upper arm of the respective arm of the user when the user is sitting in the chair, the upper arm rod having a horizontal portion and a vertical portion, the horizontal portion being perpendicular to the vertical portion wherein the upper arm rod has an L-shape, the horizontal portion extending outwardly from the back rest, the vertical portion extending downwardly from the horizontal portion, the vertical portion being pivotably coupled to the horizontal portion;

a forearm rod being coupled to the upper arm rod wherein the forearm rod is configured to align with a forearm of the respective arm of the user, the forearm rod extending forwardly from the vertical portion of the upper arm rod distally to the horizontal portion, the forearm rod being pivotably coupled to the upper arm rod, the forearm rod being pivotable to a stretched arm position wherein the forearm rod is parallel to the upper arm rod when the forearm rod is in the stretched arm position, the forearm rod being pivotable to a relaxed arm position wherein the forearm rod is perpendicular to the upper arm rod when the forearm rod is in the relaxed arm position;

a glove being coupled to the forearm rod distally to the upper arm rod wherein the glove is configured to receive a hand of the respective arm of the user when the user is sitting in the chair, the glove including:

a palm plate extending forwardly from the forearm rod wherein the palm plate is configured to support a palm of the hand of the respective arm of the user when the user is sitting in the chair;

a plurality of finger sleeves being coupled to and extending forwardly from the palm plate wherein each finger sleeve of the plurality of finger sleeves is configured to receive a respective finger of the hand of the respective arm of the user when the user is sitting in the chair, each finger sleeve of the plurality of finger sleeves being flexible wherein each finger sleeve of the plurality of finger sleeves is configured to bend when the user bends the respective finger of the hand;

a forearm strap being coupled to the forearm rod, the forearm strap being positioned proximate to the glove wherein the forearm strap is configured to secure the forearm of the respective arm of the user to the forearm rod when the user is sitting in the chair, the forearm strap including:

a forearm strap first portion extending outwardly from the forearm rod;

a forearm strap second portion extending outwardly from the forearm rod distally to the forearm strap first portion, the forearm strap second portion being aligned with the forearm strap first portion;

a forearm strap fastener releasably coupling the forearm strap first portion to the forearm strap second portion, the forearm strap fastener including:

a forearm strap first portion fastening member being coupled to the forearm strap first portion;

a forearm strap second portion fastening member being releasably engageable with the forearm strap first portion fastening member, the forearm strap second portion fastening member being coupled to the forearm strap second portion;

wherein the forearm strap fastener comprises a hook and loop material;

a wrist ball joint coupling the glove to the forearm rod, the forearm strap being positioned proximate to the wrist ball joint, the wrist ball joint pivotably coupling the glove to the forearm rod wherein the glove is pivotable toward opposing lateral sides of the forearm rod and wherein the glove is pivotable upwardly and downwardly relative to the forearm rod;

a pair of shoulder members being coupled to the chair, the pair of shoulder members being positioned on the head rest proximate to the top end of the chair, each shoulder member of the pair of shoulder members extending outwardly from a respective lateral end of the pair of lateral ends of the peripheral side of the chair wherein each shoulder member of the pair of shoulder members is configured to contact a respective shoulder of the user when the user is sitting in the chair, each shoulder member of the pair of shoulder members being configured to resist movement of the respective shoulder of the user wherein each shoulder member is configured to facilitate the user in strengthening the respective shoulder, each shoulder member of the pair of shoulder members including:

a shoulder rod extending outwardly from the respective lateral end of the pair of lateral ends of the peripheral side of the chair, the shoulder rod being angled extending forwardly from the head rest and downwardly toward the seat;

a shoulder grip being coupled to the shoulder rod, the shoulder grip extending downwardly from the shoulder rod wherein the shoulder grip is configured to contact the respective shoulder of the user when the user is sitting in the chair, the shoulder grip being pivotably coupled to the shoulder rod wherein the shoulder grip is configured to pivot forwardly and backwardly with respect to the shoulder rod, the shoulder grip including:

a shoulder grip first end;

a shoulder grip second end;

a shoulder grip upper edge being positioned adjacent to the shoulder rod, the shoulder grip upper edge being convexly arcuate between the shoulder grip first end and the shoulder grip second end;

a shoulder grip lower edge being concavely arcuate between the shoulder grip first end and the shoulder grip second end;

an electronic device being coupled to the chair, the electronic device being configured to wirelessly communicate with an external computing device, the electronic device having a display screen facing the chair, the electronic device being positioned in front of the back rest wherein the display screen is configured to be visible to the user when the user is sitting in the chair, the electronic device being a tablet, the electronic device including:

a software enabling the electronic device for programming one or more of the pair of leg members, the pair of arm members, and the pair of shoulder members and wherein the software facilitates the user in selectively actuating movement of one or more of the pair of leg members, the pair of arm members, and the pair of shoulder members to facilitate the user in exercising the body; and an electronic device support arm coupling the electronic device to the chair, the electronic device support arm being positioned on a lateral end of the pair of lateral ends of the peripheral side of the chair, the electronic device support arm extending forwardly from the back rest, the electronic device support arm being articulated wherein a position of the electronic device relative to the chair is adjustable.

* * * * *